United States Patent [19]

Watanabe et al.

[11] Patent Number: 5,148,026
[45] Date of Patent: Sep. 15, 1992

[54] SCANNING PROBE MICROSCOPY

[75] Inventors: Miyoko Watanabe; Kuniyoshi Tanaka, both of Yokohama, Japan

[73] Assignee: Kabushiki Kaisha Toshiba, Kawasaki, Japan

[21] Appl. No.: 794,229

[22] Filed: Nov. 19, 1991

[30] Foreign Application Priority Data

Nov. 20, 1990 [JP] Japan .................................. 2-312904
Mar. 20, 1991 [JP] Japan .................................. 3-56871

[51] Int. Cl.$^5$ ............................................. H01J 37/00
[52] U.S. Cl. ..................................... 250/306; 250/307
[58] Field of Search ................................ 250/306, 307

[56] References Cited

U.S. PATENT DOCUMENTS

| | | | |
|---|---|---|---|
| 4,043,577 | 8/1991 | Pohl et al. | 250/306 |
| 4,877,957 | 10/1989 | Okada et al. | 250/306 |
| 5,025,153 | 6/1991 | Okada et al. | 250/306 |
| 5,059,793 | 10/1991 | Miyamoto et al. | 250/306 |

FOREIGN PATENT DOCUMENTS

| | | |
|---|---|---|
| 0338083 | 7/1989 | European Pat. Off. . |
| 1-206202 | 8/1989 | Japan . |
| 2-275350 | 11/1990 | Japan . |

OTHER PUBLICATIONS

Surface Science 126 (1983) 236-244, North-Holland Publishing Co., "Scanning Tunneling Microscopy", G. Binnig et al.
G. E. Poirier et al., A New Ultra-High Vacuum Scanning Tunneling Microscope Design for Surface Science Studies, pp. 3113-3118, Review of Scientific Instruments, vol. 60, No. 10, 1989 American Institute of Physics.
M. O. Watanabe et al., High-Temperature Scanning Tunneling Microscope, pp. 327-329, vol. 8, No. 1, Journal of Vacuum Science and Technology: Part A, Jan. 1990, New York, N.Y.

Primary Examiner—Jack I. Berman
Assistant Examiner—Kiet T. Nguyen
Attorney, Agent, or Firm—Oblon, Spivak, McClelland, Maier & Neustadt

[57] ABSTRACT

A probe arranged to oppose a sample is coupled to a driving portion constituted by an actuator capable of obtaining a large expansion/contraction amount and an actuator capable of obtaining a small expansion/contraction amount. In order to keep the gap length between the sample and the probe constant, a first gap length control system drives the actuator and a second gap length control system having a driving time constant smaller than that of the first gap length control system drives the actuator in response to changes in gap length between the sample and the probe.

11 Claims, 7 Drawing Sheets

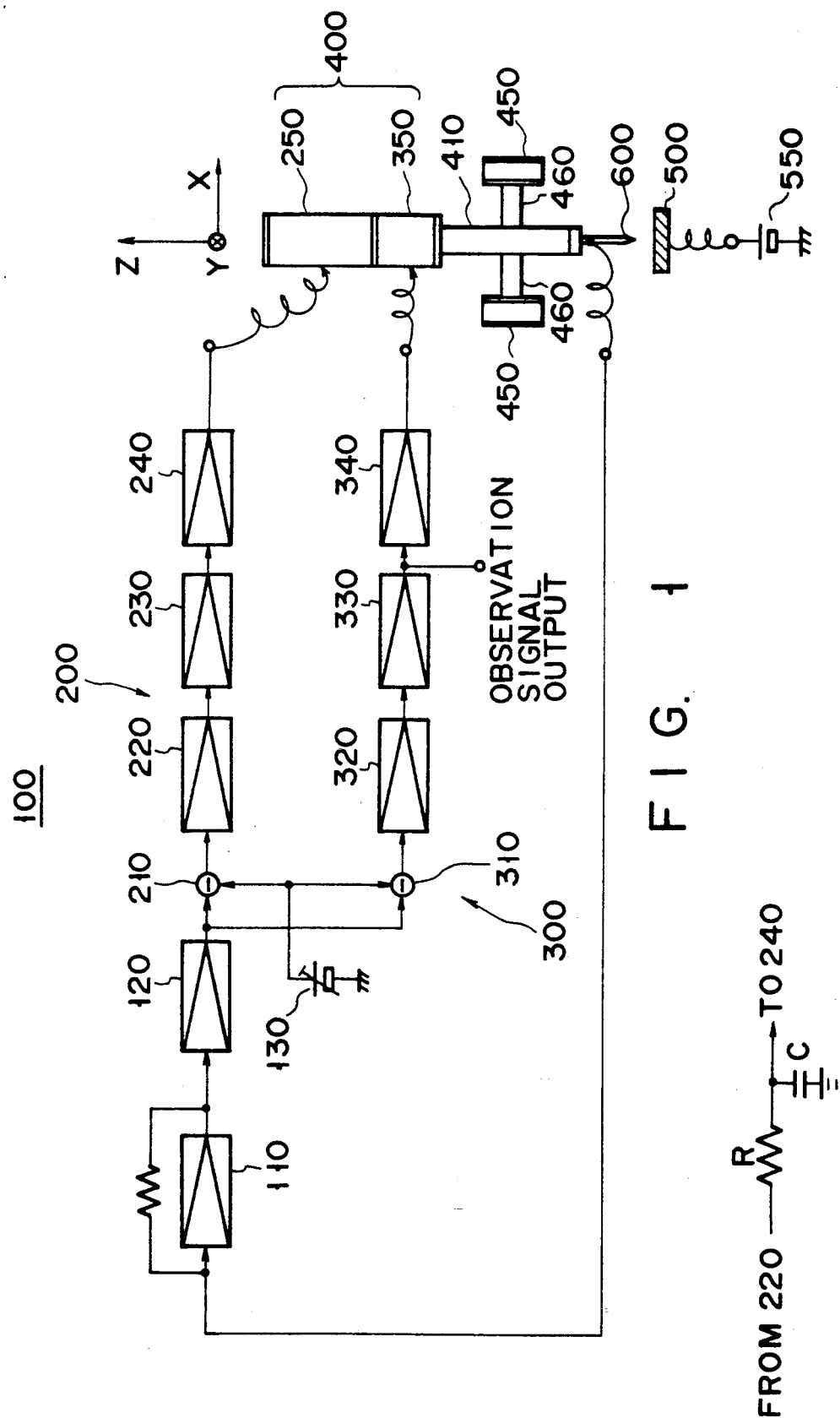
F I G. 1
F I G. 2

F I G. 3A
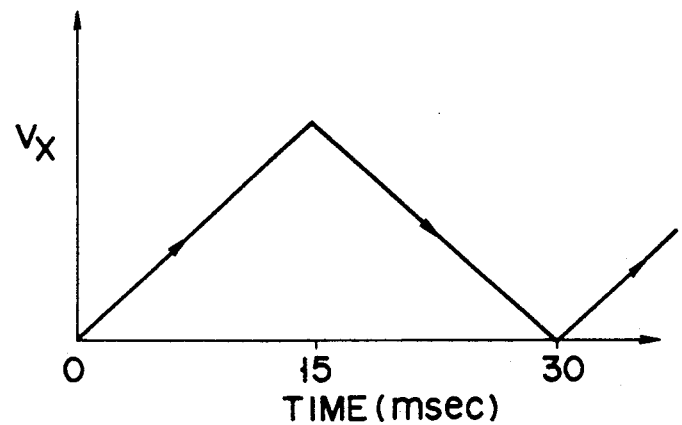
F I G. 3B
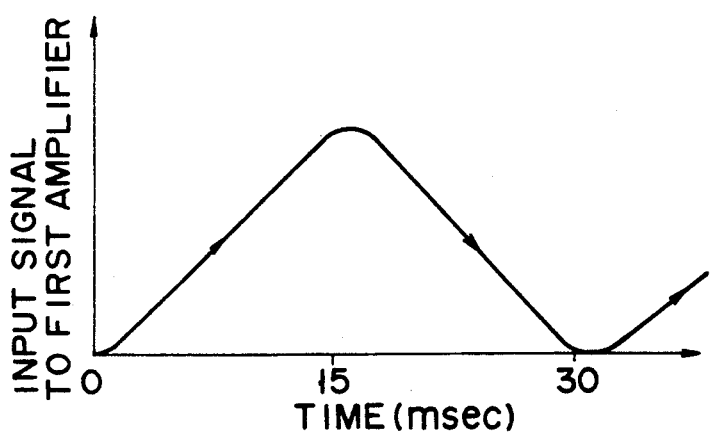
F I G. 3C
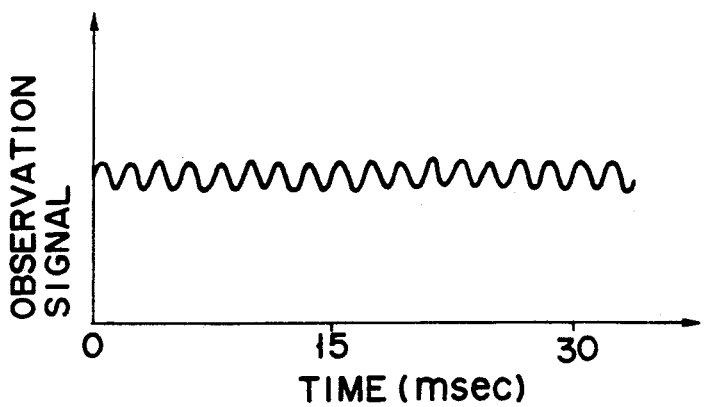

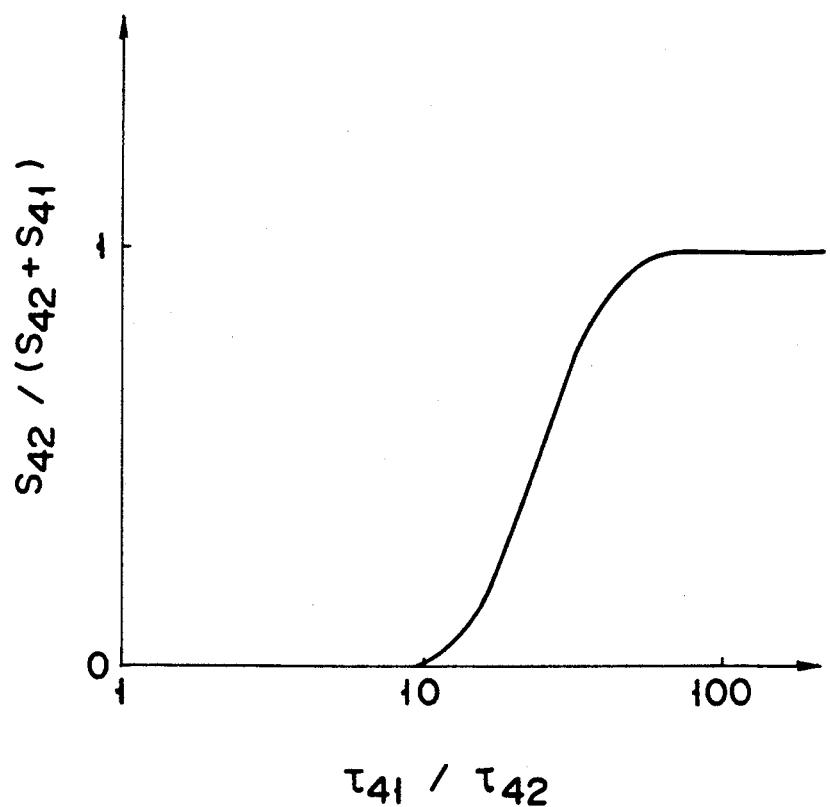
F I G. 6

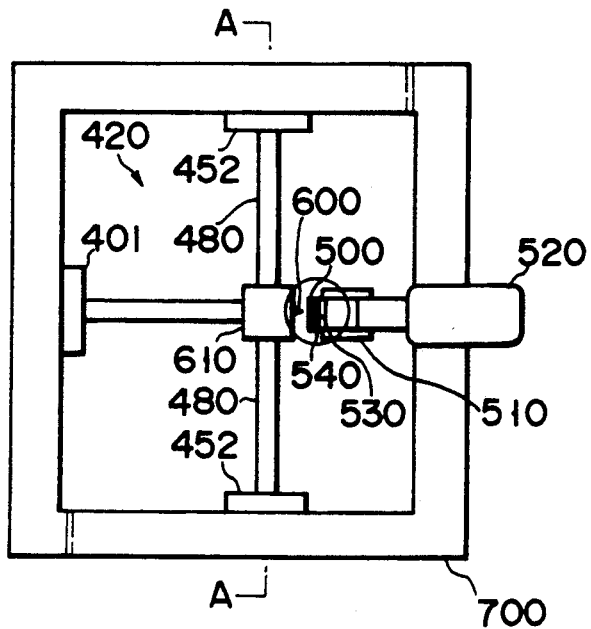
FIG. 7A
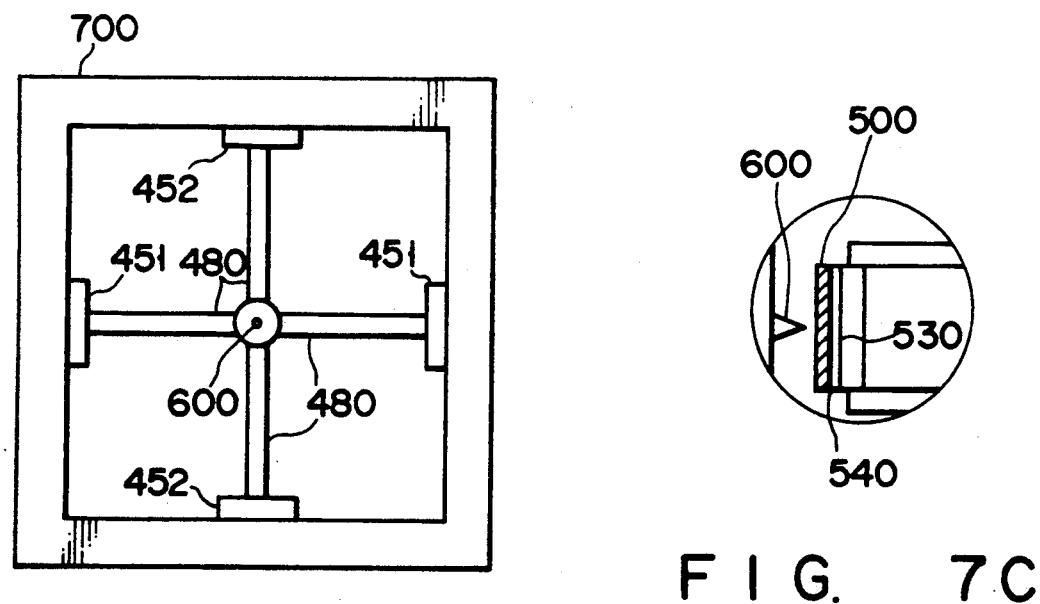
FIG. 7B
FIG. 7C

SCANNING PROBE MICROSCOPY

BACKGROUND OF THE INVENTION

1. Field of the Invention

The present invention relates to a scanning probe microscopy used for, e.g., a surface measuring apparatus, a surface treatment apparatus, and a surface processing apparatus.

2. Description of the Related Art

A scanning tunneling microscopy (to be referred to as an STM hereinafter) has been developed as a device for observing each atom on the surface of a solid one by one. A conductive probe having a sharp tip scans the surface of a conductive sample in STM. The STM is designed to measure the structure of the sample surface at the atomic level by measuring a tunnel current flowing between the sample and the probe during scanning. Since the STM performs measurement by using a tunnel current flowing between a sample and the probe, the STM can be applied to only conductive samples. Recently, however, a microscope capable of measuring the surface of an electrically insulating sample has been developed by utilizing the technology of STMs. This microscopy is called an atomic force microscopy (to be referred to an AFM hereinafter), which is designed such that a probe is supported by a cantilever, and the displacement of the cantilever caused by a force acting between a sample surface and the probe is measured by using the principle of STMs, thereby measuring the structure of the sample surface. Similar to the STM, the AFM can three-dimensionally measure the shape (structure) of a sample surface by measuring the displacement of the cantilever while scanning the sample surface using the probe.

STMs and AFMs can be applied not only to measurement of sample surfaces but also to processing apparatuses and surface treatment apparatuses. If, for example, they are applied to processing apparatuses, the probe is moved to a desired position on a surface after a sample structure is measured, and a pulse voltage is applied between the prove and the sample to perform atomic-scale microscopic processing under the probe. In addition, by causing the probe to collide with a sample surface, a microscopic uneven pattern can be formed on the sample surface. In the application of STMs and AFMs to surface treatment apparatuses, if gaseous or liquid molecules are present between the probe and a sample, the molecules are attracted to or repelled from the sample by an electric field generated by an applied voltage.

In the above-described STM or AFM, the surface of a sample must be scanned by the probe. A so-called scanning probe microscopy for realizing such a scanning operation is generally constituted by a ga length control system for keeping the gap length between the probe and the sample constant, and a scanning system for causing the probe to scan the surface of the sample by moving the probe and sample relative to each other in a direction along the sample surface.

The gap length control system of the conventional scanning probe microscopy is designed to drive a Z-axis direction driving piezoelectric element so as to keep a tunnel current flowing between a sample and the probe constant, i.e., keep the gap length between the sample and the probe constant, and extract an input signal to an amplifier as an observation signal. If, therefore, an uneven pattern of the atomic level is formed on the surface of the sample, the observation signal changes in accordance with the uneven pattern. The surface structure of the sample can be determined in accordance with the changes in observation signal.

The following problems, however, are posed in the conventional scanning probe microscopy. The surface of a sample is not necessarily parallel to the X-Y plane but is often inclined therefrom at a certain angle. For this reason, in order to measure an uneven pattern on the surface of a sample throughout a wide range of the surface, a piezoelectric element having a large expansion/contraction amount is required. Therefore, a high-voltage amplifier is used to satisfy the above requirement. In general, however, a high-voltage amplifier has a low response speed (i.e., a large time constant) and produces large noise.

In the above-described STM, since the scanning speed is determined by the tracking speed of the Z-axis driving piezoelectric element and an electrical amplification time, scanning requires several minutes per frame ($=100$ Å $\times 100$ Å). In addition, if high-speed scanning is forcibly performed, although the apparatus can roughly respond to the height and depth of a sample, it is difficult to observe a fine uneven surface.

As described above, in the conventional scanning probe microscopy, the upper limit of the scanning speed at which the probe can scan the surface of a sample is determined by the driving time constant of the gap length control system for driving the piezoelectric element, especially the response speed of the high-voltage amplifier for applying a voltage to the piezoelectric element. For this reason, the scanning speed cannot be essentially increased. The problem of low scanning speed causes various inconveniences. In many cases, the surface structure of a sample changes with the lapse of time. If, therefore, the conventional scanning probe microscopy is used, a surface structure which changes with the lapse of time cannot be measured in a real-time manner. The performance of a scanning probe microscopy and the like is determined by the speed at which a sample surface can be scanned. Similarly, in surface processing, the performance of an apparatus is determined by the speed at which microscopic surface processing can be performed.

In order to eliminate the above-described inconvenience, it may be required that a high-speed, high-voltage amplifier having small noise and a high response speed be manufactured. The realization of the high-speed, high-voltage amplifier accompanies technical difficulty and inevitably causes an increase in cost.

As described above, since the scanning speed of the conventional scanning probe microscopy cannot be increased, the microscopy cannot be applied to high-speed measurement, processing, treatment, and processing.

In another method, an image of a measured portion is formed by detecting changes in tunnel current. This method, however, cannot respond well to large inclinations and a rough uneven pattern on the surface of a sample and the probe may inadvertently collide with the sample surface.

In addition, when a sample is to be measured while it is heated, deformation and the like of the sample due to heat may be caused. Therefore, an increase in speed of scanning is required.

The techniques associated with the present invention are disclosed in Published Unexamined Japanese Patent Application Nos. 1-206202 and 2-275350 and G. Binnig and H. Rohor, "SCANNING TUNNELING MICROSCOPY", IBM Zurich Research Laboratory, CH-88003 Ruschlikon, Switzerlar, Sept. 25, 1987, pp. 236-244.

SUMMARY OF THE INVENTION

It is an object of the present invention to provide an improved scanning probe microscopy.

A scanning probe microscopy of the present invention is characterized by comprising a probe arranged to oppose a surface of a sample, gap length control means for keeping a gap length between said probe and the sample constant, said gap length control means including at least two actuators for moving said probe and the sample relative to each other in a first direction in accordance with a sum of displacement amounts of said actuators, and at least two control systems, arranged in correspondence with said actuators and having different driving time constants, for driving the corresponding actuators in response to changes in gap length between said probe and the sample; and scanning means for causing said probe to scan the surface of the sample by moving said probe and the sample relative to each other in second and third directions parallel to the surface of the sample. A sample indicates a sample itself when the present invention is applied to an STM. However, when the present invention is applied to an AFM, a sample indicates a sample simulated by the displacement of a cantilever.

Assume that two actuators are arranged, and that one actuator is constituted by a first piezoelectric element, and the other actuator is constituted by a second piezoelectric element capable of obtaining an expansion/contraction amount larger than that of the first piezoelectric element. In addition, assume that the driving time constant of a control system for driving the first piezoelectric element is smaller than that of a control system for driving the second piezoelectric element. Since the first piezoelectric element and the control system for driving it have high response speed, they move the prove and the sample relative to each other in accordance with a microscopic uneven pattern on the sample surface. Since the second piezoelectric element and the control system for driving it have low response speed, they move the probe and the sample relative to each other in accordance with slow inclinations of the sample. Therefore, even if scanning is performed at high speed, the gap length between the probe and the sample can be kept constant. In addition, a microscopic structure on the sample surface can be measured or processed with high resolution while a wide range of the sample surface is scanned at high speed.

As described above, according to the present invention, the gap control system for keeping the gap length between the sample and the probe constant is constituted by a plurality of stages, and a specific stage of the gap length control system is constituted by a control system having a smaller driving time constant than the other control systems. With this arrangement, the gap length control system having a large driving time constant can cause the probe to respond to the inclinations and gradual displacements of the sample surface, while the gap length control system, of the specific stage, which has a small driving control system can cause the probe to faithfully respond to an atomic-level uneven pattern on the sample surface. Therefore, even if scanning is performed at high speed, the gap length between the sample and the probe can always be kept constant without requiring an expensive amplifier and the like.

Furthermore, according to the present invention, since a heat buffer is arranged in addition to a sample heating means, while the actuator and the micrometer are kept at room temperature, the surface structure of a heated sample can be measured with high precision, and high-speed scanning can be performed while the sample is heated. Therefore, the heated sample can be measured with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a main part of a scanning probe microscopy according to an embodiment of the present invention;

FIG. 2 is a circuit diagram showing a time constant circuit in FIG. 1;

FIGS. 3A to 3C are graphs respectively showing the waveforms of signals appearing at the respective components when the scanning probe microscopy shown in FIG. 1 is applied to an STM and the surface of a sample having a slow inclination is reciprocally scanned at high speed;

FIG. 6 is a graph showing the driving time constant and signal intensity ratio of a first and second gap length control systems constituting a gap length control system in the scanning probe microscopy in FIG. 1;

FIGS. 7A to 7C are views showing an embodiment of a sample heating means applied to the scanning probe microscopy of the present invention;

DETAILED DESCRIPTION OF THE PREFERRED EMBODIMENTS

Figure 4:
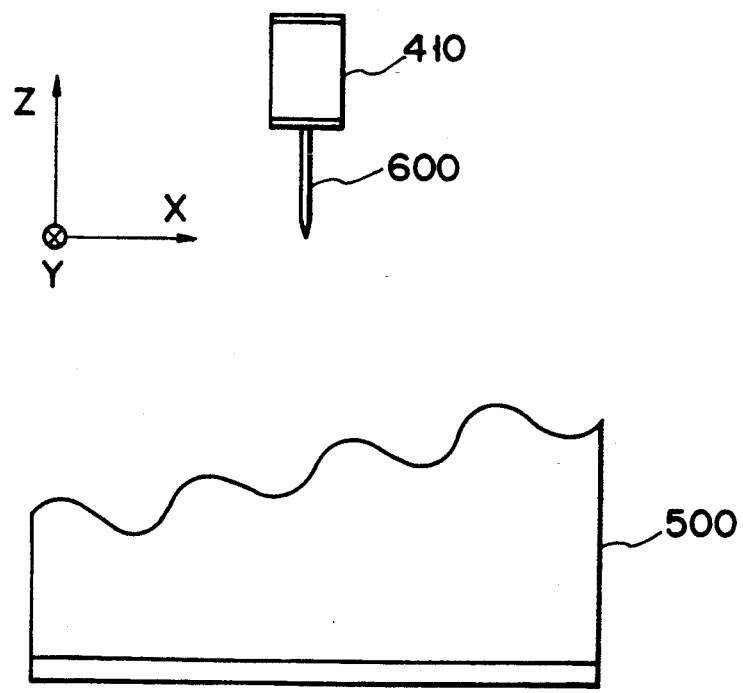
FIG. 4 is a view showing the relationship between a sample and a probe in a case wherein a sample surface is observed by using the scanning probe microscopy in FIG. 1.

An embodiment of the present invention will b described below with reference to the accompanying drawings.

FIG. 1 shows a scanning probe microscopy according to an embodiment of the present invention. FIG. 1 shows a scanning probe microscopy for an STM as an example and shows only a gap length control system 100 of the microscopy in detail.

Referring to FIG. 1, a probe 600 is located to oppose the surface of a sample 500. The probe 600 is fixed to a shaft 410, which is coupled to a Z-axis direction driving portion 400. The shaft 410 is coupled to X/Y-axis driving actuators (e.g., piezoelectric elements) 450 through coupling shafts 460.

The driving portion 400 is constituted by actuators 250 and 350 which are coupled to each other in the Z-axis direction. The actuator 250 is constituted by, e.g., a piezoelectric element to have an expansion/contraction amount large enough to respond to large displacements of about 3,000 to 5,000 Å, e.g., the inclinations and deformation of the surface of the sample 500. Similarly, the actuator 350 is constituted by, e.g., a piezoelectric element to have a suitable expansion/contraction amount for atomic-level displacements of the surface of the sample 500. More specifically, the actuator 250 is constituted by a member (e.g., a piezoelectric element) having an expandability of 5 Å per volt, whereas the actuator 350 is constituted by a member (e.g., piezoelectric element) having an expandability of 1 Å per volt.

A bias power source 550 is connected to the sample 500 to supply a tunnel current between the sample 500 and the probe 600. In this embodiment, a battery is used as the bias power source 550 to prevent noise.

The actuators 250 and 350 are respectively driven by first and second gap length control systems 200 and 300.

The first gap length control system 200 comprises an I/V amplifier 110, a log amplifier 120, a reference power source 130, a first subtracter 210, a first error amplifier 220, a first time constant circuit 230, and a first amplifier 240. A tunnel current flowing between the sample 500 and the probe 600 is converted into a voltage signal by the I/V amplifier 110 (capable of switching the gain to $10^7$ V/A, $10^8$ V/A, and $10^9$ V/A). The voltage signal is then supplied to one of the two input terminals of the first subtracter 210 through the log amplifier 120. An output from the reference power source 130 is supplied to the other input terminal of the first subtracter 210, and a difference signal is output from the first subtracter 210. The difference signal is amplified by the first error amplifier 220 and is subsequently supplied to the first amplifier 240 through the first time constant circuit 230. As the first amplifier 240, an amplifier having an input amplitude of $\pm 5$ V, a gain of 100, an output amplitude of $\pm 500$ V, a noise level of 7 mV at the maximum amplitude, and a response time constant which changes between about 0.1 and 10 seconds is used. The actuator 250 is driven by an output from the first amplifier 240.

The second gap length control system 300 comprises the I/V amplifier 110, the log amplifier 120, the reference power source 130, a second subtracter 310, a second error amplifier 320, a second time constant 330, and a second amplifier 340. An output from the log amplifier 120 is supplied to one of the two input terminals of the second subtracter 310. An output from the reference power source 130 is supplied to the other input terminal of the second subtracter 310, and a difference signal is output from the second subtracter 310. The difference signal is amplified by the second error amplifier 320 and is subsequently supplied to the second amplifier 340 through the second time constant circuit 330. As the second amplifier 340, for example, an amplifier having a gain of 1, input and output amplitudes of $\pm 5$ V, a noise level of 0.5 mV at the maximum amplitude, and a response time constant of about 1 to 100 milliseconds is used. The actuator 350 is driven by an output from the second amplifier 340. An input signal to the second amplifier 340 is also used to output an observation signal. In addition, an input signal to the first amplifier 240 is also used to output an observation signal, as needed.

In the arrangement shown in FIG. 1, the first and second time constant circuits 230 and 330 are each constituted by a resistor R and a capacitor C, as shown in FIG. 2. In addition, the first amplifier 240 is constituted by an amplifier having a higher voltage than the second amplifier 340.

The actuator 450 for driving the prove 600 in the X-and Y-axis directions is driven by an output from a scanning control system (not shown).

An operation of the scanning probe microscopy having the above-described arrangement will be described below.

The main scanning control system (not shown) is operated to drive the actuator 450 to scan the surface of the sample 500 in the X- and y-axis directions by using the probe 600 located near the surface of the sample 500. During the scanning operation, the first and second gap length control systems 200 and 300 respectively control the expansion/contraction amounts of the first and second actuators 250 and 350 in accordance with an uneven pattern on the surface of the sample 500 in such a manner that the value of a current flowing between the sample 500 and the probe 600 is always equal to the value defined by the output level of the reference power source 130. By controlling the expansion/contraction amounts, the gap length between the sample 500 and the probe 600 is always kept constant.

In the above case, the first gap length control system 200 uses a high-voltage amplifier as the first amplifier 240 in order to ensure a large expansion/contraction amount. For this reason, a high response speed cannot be expected from the first gap length control system 200, but the system 200 can respond well to the inclinations and gradual displacements of the surface of the sample 500. In contrast to this, the second gap length control system 300 requires no large expansion/contraction amount. Since the system 300 can use an amplifier having a high response speed as the second amplifier 340, it can respond well to a microscopic uneven pattern on the surface of the sample 500. Owing to the operations of the two gap length control systems 200 and 300, the gap length between the sample 500 and the probe 600 can always be kept constant even if scanning is performed at a high speed. As described above, when the gap length control system of the present invention is incorporated in an STM and an AFM, or a processing apparatus and a surface treatment apparatus using them, proper measurement and processing can be performed even at a high scanning speed.

FIGS. 3A to 3C and 4 show an application of the embodiment of the present invention.

FIG. 3A shows a triangular wave applied to the X-axis direction driving actuator. FIG. 3B shows an input signal to a first amplifier. FIG. 3C shows an output observation signal. A scanning operation was performed with respect to a sample having a surface structure shown in FIG. 4 by using a scanning probe microscopy constituted by a first gap length control system 200 having a driving time constant of about 15 milliseconds and a second gap length control system 300 having a driving time constant of about 1 millisecond. FIGS.

3B and 3C respectively show changes in an input signal to a first amplifier 240 and changes in an input signal (observation signal) to a second amplifier 340 when a triangular wave having a short transition time up to a peak of 15 milliseconds (as shown in FIG. 3A) was applied to the X-axis direction driving actuator to cause the probe 600 to reciprocate in the X-axis direction. As is apparent from FIGS. 3A to 3C, the input signal to the first amplifier 240 responds to only slow inclinations of the sample, whereas the input signal to the second amplifier 340 responds to a microscopic uneven pattern on the sample surface, i.e., the positions of atoms.

Figure 5:
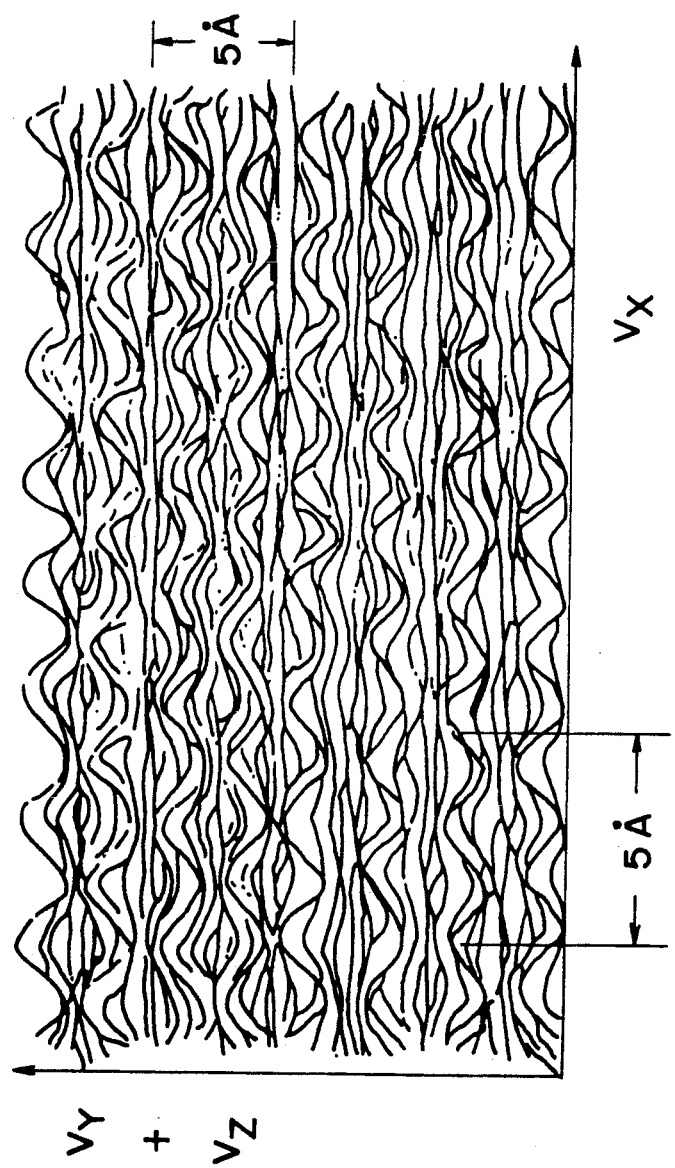
FIG. 5 is a view showing an observation signal image obtained when the scanning probe microscopy is applied to an STM and a predetermined region on the surface of a graphite sample is scanned at high speed.

FIG. 5 shows an observation signal image obtained by scanning the surface of a graphite sample along 64 scanning lines in the Y-axis direction under the same driving conditions as those in the case shown in FIGS. 3A to 3C. As shown in FIG. 5, it took two seconds to scan the entire region. That is, the scanning speed is increased to 100 times that of the conventional apparatus.

FIG. 6 is a graph obtained by plotting the ratio of a driving time constant $\tau_{41}$ of the first gap length control system 200 to a time constant $\tau_{42}$ of the second gap length control system 300, and the ratio of an input signal $S_{42}$ to the second amplifier 340 to the sum of an input signal $S_{41}$ to the first amplifier 240, which changes in accordance with the unevenness of atoms on the surface of a sample, and the input signal $S_{42}$. As is apparent from FIG. 6, the effect of the present invention is obtained when the ratio of the driving time constants becomes 10 or more.

As described above, the gap length control system 100 for keeping the gap length between the sample 500 and the probe 600 constant is constituted by the first gap length control system 200 which has a low response speed but can obtain a large expansion/contraction amount, and the second gap length control system 300 which cannot obtain a large expansion/contraction amount but has a high response speed. With this arrangement, the probe 600 can be caused to respond to the inclinations and gradual displacements of the surface of the sample 500 by the first gap length control system 200, while the probe 600 can be caused to faithfully respond to an atomic-level uneven pattern on the surface of the sample 500 by the second gap length control system 300. Therefore, even if scanning is performed at high speed, the gap length between the sample 500 and the probe 600 can always be kept constant by the first and second gap length control systems 200 and 300. As described above, if the gap length control system of the present invention is applied to an STM and an AFM, or a surface treatment apparatus and a processing apparatus using them, measurement, processing, or treatment can be finished before the surface structure of a sample changes because of thermal drift and the like. A heating means for a sample surface will be described later.

Since the first gap length control system 200 does not require a high response speed, an amplifier having a low frequency response speed, i.e., an inexpensive, low-noise, high-voltage amplifier, can be used as the first amplifier 240. Since the second gap length control system 300 need only apply a low voltage to the actuator 350, an output from a general operational amplifier (IC) having a high frequency response speed and low output noise can be directly applied to the actuator 350.

An embodiment of a sample heating mean applied to the scanning probe microscopy of the present invention will be described next.

FIG. 7A shows the overall arrangement of an STM according to the present invention. FIG. 7B is a sectional view taken along a line A—A in FIG. 7A. FIG. 7C is an enlarged view showing a main part in FIG. 7A.

In the STM of the present invention, X-, Y-, and Z-axis direction driving actuators 451, 452, and 401 constituting a probe scanning means 420 are connected to a probe holder 610 through couplings 480, each consisting of, e.g., Invar alloy (an alloy consisting of nickel, manganese, carbon, and iron containing other elements) having a small thermal expansivity and serving as a heat buffer. The probe holder 610 serves to hold a probe.

The STM of the present invention comprises an STM main body 700 composed of such as Invar alloy having a small thermal expansivity, the probe scanning means 420 mounted on the STM main body 700 and designed to cause a probe 600 to scan, and a micrometer 520 having a sample support base 510 mounted at its distal end and designed to coarsely adjust the distance between a sample 500 and the probe 600. A graphite heater 530 is arranged on the surface of the sample support base 510. In addition, a boron nitride plate 540 is arranged to cover the surface of the graphite heater 530 and be in contact with the rear surface of the sample 500. The probe 600 consists of platinum.

Measurement was performed in the following manner. First, a graphite sample was placed on the sample support base 510. After positioning was roughly performed by the micrometer 520, a current of 0.5A was supplied to the graphite heater 530 before measurement to increase the temperature of the sample to about 400° C. While the sample was kept at this temperature, the X-, Y-, and Z-axis direction driving actuators 451, 452, and 401 were driven to cause the probe 600 to scan, thus measuring an atomic image on the sample surface.

During the measurement of the sample surface, the couplings 480 were set at 27° C., and the micrometer 520 was set at 37° C. It is, therefore, apparent that the respective components such as the actuators and the micrometer are substantially kept at room temperature even if a sample is heated to a high temperature.

Since measurement can be performed while the components such as the actuators and the micrometer are kept at room temperature, and a sample is kept at about 400° C., a very stable atomic image can be measured. Especially in this embodiment, since the boron nitride plate 540 is used as an insulating means, the sample surface is kept at a uniform temperature, and high-precision measurement can be performed.

A combination of the heating means and the gap length control system in this embodiment enables high-speed, high-precision measurement.

In the above embodiment, the STM is exemplified. However, the present invention is not limited to this. The heating means of the present invention can be applied to a scanning capacitance microscopy for detecting a capacitance between a probe and a sample by using the same apparatus as that described above, and other surface measuring apparatuses such as an apparatus for detecting an attracting force between an atom of a probe and an atom of a sample, or an AFM.

Figure 8A:
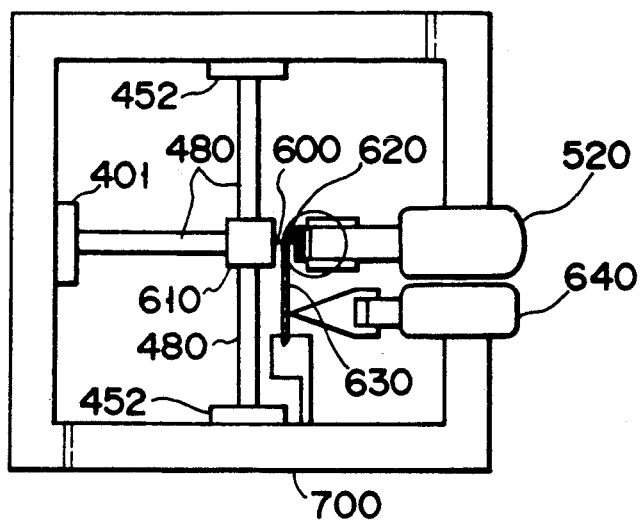
FIGS. 8A and 8B are views showing a case wherein the sample heating means applied to the scanning probe microscopy of the present invention is applied to an atomic force microscopy.
Figure 8B:
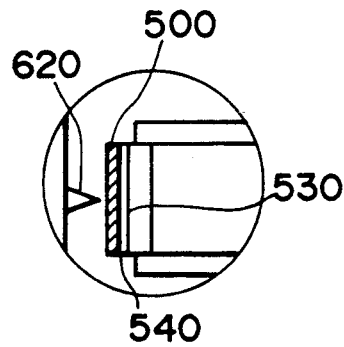
Figure 9:
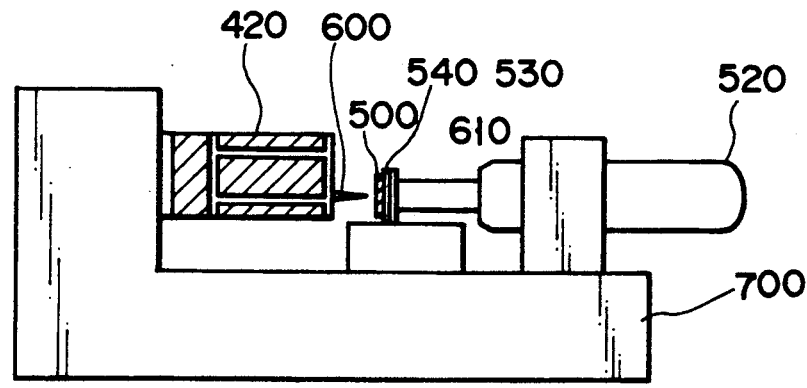
FIG. 9 is a view showing an arrangement of a sample heating means from which a coupling (heat buffer) is omitted.

FIGS. 8A and 8B show a case wherein the sample heating means of the present invention is applied to an AFM. FIG. 8B is an enlarged view showing a main part of the AFM in FIG. 8A. The same reference numerals in FIG. 8B denote the same parts as in FIG. 8A. As shown in FIGS. 8A and 8B, this AFM is characterized in that an atomic force measurement needle 620 supported by a cantilever 630 is arranged in addition to a tunnel current detecting probe 600. Other arrangements are the same as those of the apparatus shown in FIGS. 7A to 7C. X-, Y-, and Z-axis direction driving actuators 451, 452, and 401 constituting a probe scanning means 420 are connected to a probe holder 610, which holds the probe 600, through couplings 480, each consisting of Invar alloy having a small thermal expansivity. The AFM includes a cantilever driving micrometer 640 for coarsely adjusting the cantilever 630. In addition, in the embodiments shown in FIGS. 7A to 7C and FIGS. 8A and 8B, each coupling is composed of a material having small thermal expansivity and is used as a heat buffer, while the boron nitride plate 540 is arranged to cover the heater arranged on the sample support base, thus maintaining electrical insulation between the sample and the heater. However, effective insulation can be ensured by using only one of the two arrangements described above. For example, a probe holder can be directly connected to an actuator without using a coupling. FIG. 9 shows such a case.

The STM shown in FIG. 9 comprises an STM main body 700, an actuator 420 mounted on the STM main body 700 and designed to cause a probe 600 to scan, a micrometer 520 having a sample support base 610 mounted at its distal end and designed to coarsely adjust the distance between a sample 500 and the probe 600, a graphite heater 530 arranged on the surface of the sample support base 610, and a boron nitride plate 540 arranged to cover the surface of the graphite heater 530 and be in contact with the sample surface. The probe 600 is composed of platinum.

The present invention is not limited to the embodiment described above. For example, the following modifications can be made.

1) In the above-described embodiment, a sample is fixed in position, and the probe is moved relative to the sample. However, in contrast to this, the probe may be fixed in position, and a sample may be moved. In addition, the some actuators may be arranged on the probe side, while some other actuators may be arranged on the sample side. For example, the actuator 250 may be arranged on the probe side, while the actuator 350 may be arranged on the sample side. The respective actuators may be located to replace each other. The actuator 450 may be arranged on the sample side, while the actuators 250 and 350 may be arranged on the sample side.

2) In the above-described embodiment, the gap length control system is constituted by two stages. However, the system may be constituted by three or more stages. In this case, the system can respond to more complicated changes as compared with the system constituted by two stages.

The scanning probe microscopy according to the present invention relates to any apparatus for scanning a sample surface using a probe while keeping the gap length between a sample and the probe constant, e.g., an STM, an AFM, and a capacitance microscope, each associated with measurement of a sample, and a surface treatment apparatus associated with treatment of a sample, and an apparatus for performing microscopic processing on a sample surface, associated with processing of a sample. That is, the present invention can be applied to various fields. If, for example, the present invention is applied to a capacitance microscope, gap length information is obtained from a capacitance between the probe and a sample.

Other modifications and changes can be made within the spirit and scope of the invention.

Additional advantages and modifications w 11 readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning probe microscopy comprising:
   a probe arranged to oppose a surface of a sample;
   gap length control means for keeping a gap length between said probe and the sample constant, said gap length control means including at least two actuators for moving said probe and the sample relative to each other in a first direction in accordance with a sum of displacement amounts of said actuators, and at least two control systems, arranged in correspondence with said actuators and having different driving time constants, for driving the corresponding actuators in response to changes in gap length between said probe and the sample; and
   scanning means for causing said probe to scan the surface of the sample by moving said probe and the sample relative to each other in second and third directions parallel to the surface of the sample.

2. A microscopy according to claim 1, wherein said actuators include first and second actuators, said first actuator being constituted by a first piezoelectric element, and said second actuator being constituted by a second piezoelectric element capable of obtaining a larger displacement amount than said first actuator, and said control systems include first and second control systems for respectively driving said first and second piezoelectric elements, said first control system having a driving time constant smaller than that of said second control system.

3. A microscopy according to claim 2, wherein the driving time constant of said first control system is not more than 1/10 that of said second control system.

4. A microscopy according to claim 1, further comprising:
   heating means, arranged on the sample surface on a side opposite to said probe, for heating the sample; and
   a heat buffer for connecting said actuator to said probe.

5. A microscopy according to claim 4, wherein said heating means is constituted by a heater.

6. A microscopy according to claim 5, further comprising insulating means arranged between the sample and said heater.

7. A microscopy according to claim 6, wherein said insulating means is constituted by a boron nitride (BN) ceramic material.

8. A microscopy according to claim 1, further comprising a bias power source for causing a tunnel current to flow.

9. A microscopy according to claim 8, wherein said bias power source is a battery.

10. A microscopy according to claim 1, wherein said gap length control means includes:
    a first amplifier for responding to a large expansion/contraction amount of said actuator; and
    a second amplifier for responding to a small expansion/contraction amount of said actuator.

11. A microscopy according to claim 1, wherein one of said actuators is means for moving one of said probe and the sample.

* * * * *